| United States Patent [19] | [11] Patent Number: 4,988,460 |
| Morita et al. | [45] Date of Patent: Jan. 29, 1991 |

[54] FERROELECTRIC LIQUID-CRYSTALLINE POLYMERIC COMPOSITION

[75] Inventors: Kazuharu Morita; Shunji Uchida; Kimihiro Yuasa, all of Chiba, Japan

[73] Assignee: Idemitsu Kosan Company Limited, Tokyo, Japan

[21] Appl. No.: 539,321

[22] Filed: Jun. 13, 1990

Related U.S. Application Data

[63] Continuation of Ser. No. 243,425, Sep. 12, 1988, abandoned.

[30] Foreign Application Priority Data

Oct. 2, 1987 [JP] Japan .................................. 62-249209

[51] Int. Cl.$^5$ .............................................. C09K 19/54
[52] U.S. Cl. ............................ 252/299.5; 252/299.01; 252/299.63; 252/299.64; 252/299.65; 252/299.66; 252/299.67; 350/350 R; 350/350 S; 428/1
[58] Field of Search ............ 252/299.01, 299.5, 299.66, 252/299.65, 299.67, 299.63, 299.64; 428/1; 350/350 R, 350 S

[56] References Cited

FOREIGN PATENT DOCUMENTS 61-047427 3/1986 Japan .
WO/00606 1/1988 World Int. Prop. O. .

*Primary Examiner*—Robert L. Stoll
*Assistant Examiner*—Richard Treanor
*Attorney, Agent, or Firm*—Frishauf, Holtz, Goodman & Woodward

[57] ABSTRACT

The liquid-crystalline polymeric composition of the invention comprises (A) a non-liquid-crystalline polymeric compound and (B) a low-molecular liquid-crystalline compound each having a proton donor and/or a proton acceptor in the molecular structure and the low-molecular compound has a chiral smectic C phase. By virtue of these functional groups forming hydrogen bonds between the components, the liquid-crystalline polymeric composition of the invention is not a mere blend of the components liable to cause phase separation but is imparted with greatly increased stability and uniformity of the blend as well as responsivity of high speed.

18 Claims, No Drawings

FERROELECTRIC LIQUID-CRYSTALLINE POLYMERIC COMPOSITION

This application is a continuation of application Ser. No. 07/243,425, filed Sept. 12, 1988, abandoned.

BACKGROUND OF THE INVENTION

The present invention relates to a liquid-crystalline polymeric composition. More particularly, the invention relates to a liquid-crystalline polymeric composition freed from the problem of phase separation by the combined use of a low molecular liquid-crystalline compound and a non-liquid-crystalline polymeric compound each having a hydrogen bond-forming group.

Various kinds of low-molecular liquid-crystalline compounds are known in the prior art but none of known low-molecular liquid-crystalline compounds is satisfactory, as an inherent property of low-molecular compounds in general, in respect of the shape retainability, i.e. a property of a material capable of being shaped into any desired form.

Liquid-crystalline materials having improved shape retainability have been proposed including a composition which is a mere blend of a polymeric compound and a low-molecular liquid-crystalline compound and a polymeric compound obtained by covalent bonding molecules of a low-molecular liquid-crystalline compound to the main chain or to the side chains of the polymeric molecule.

The above mentioned composition of polymeric compound and low-molecular liquid-crystalline compounds, however, cannot be a uniform blend microscopically but has a structure of a matrix phase and a discretely dispersed phase therein because low-molecular liquid-crystalline compounds usually have one or more methyl groups at the molecular ends. Such a microscopically inhomogeneous condition of the composition is responsible for various drawbacks when the composition is used as a liquid crystal. Due to the non-uniform distribution of the low-molecular liquid-crystalline compound in the matrix of the polymeric compound, for example, the response of the polymeric composition as a liquid crystal may sometimes be non-uniform and a liquid-crystal display elements by using such a polymeric composition may exhibit decreased sharpness.

It is also not an easy and versatile way to prepare a polymeric liquid-crystalline compound having a low-molecular liquid-crystalline compound bonded to the polymeric structure by covalent bonding because the possibility of a covalent bonding formed therebetween depends on the reactivity of the respective functional groups and the reaction conditions to match the reactivity.

One of the inventors with another has previously proposed a liquid-crystalline polymeric composition having excellent shape retainability and suitable as a liquid crystal material in optoelectronic devices and the like, which is a blend of a low-molecular liquid-crystalline compound with a non-liquid-crystalline polymeric compound capable of forming a hydrogen bond therebetween (see PCT/JP87/00521). This polymeric liquid-crystalline composition, however, is still not quite satisfactory when a high-speed response is required for the liquid-crystalline composition.

While liquid-crystalline materials in general can be used in liquid-crystal display elements, the type of display in most of modern liquid-crystal display elements is the so-called TN (twisted nematic) type using liquid-crystalline materials belonging to the nematic phase. Though advantageous in respect of eye fatigue and electric power consumption as a light-receiving type, liquid-crystal displays of the TN type have problems of relatively slow response and invisibility of the display when viewed at a certain angle. Various attempts have been made to improve liquid-crystalline materials in order to comply with the demand in recent years for display units having high-speed responsivity. The shortest response time obtained in a liquid-crystal display unit, however, is still far from satisfactory when comparison is made with other light-emitting displays such as electroluminescence displays, plasma displays and the like. There would be no other way than to develop a novel type of liquid-crystal display with which the TN-type liquid-crystal display can be replaced in order to obtain high-speed responsivity comparable with that of light-emitting type displays by retaining the advantages of the light-receiving type liquid-crystal displays of low power consumption. N. A. Clarke, et al. have proposed a type of display by utilizing the phenomenon of optoswitching of a ferroelectric liquid-crysatlline material as one of the attempts along this line [see Appl. Phys. Lett., volume 36, page 899 (1980)]. Ferroelectric liquid-crystalline materials have been first disclosed by R. B. Meyer, et al. in J. de Phys., volume 36, page L-69 (1975) and include those belonging to the chiral smectic C phase, chiral smectic I phase, chiral smectic F phase, chiral smectic G phase and chiral smectic H phase, referred to hereinbelow as the $S_C^*$ phase, $S_I^*$ phase, $S_F^*$ phase, $S_G^*$ phase and $S_H^*$ phase, respectively, in the liquid-crystalline structure.

A liquid-crystal display utilizing the optoswitching effect of the $S_C^*$ phase is advantageous over the TN-type liquid-crystal displays in three respects. The first advantage is the extremely high responsivity with a response time which is 1/100 or below of the response time in conventional TN-type liquid-crystal display units. The second advantage is the memory effect which enables time-sharing driving of the display as combined with the above mentioned high-speed responsivity. The third advantage is that the display can be imparted with a gradient between brightness and darkness without difficulty. In the TN-type liquid-crystal displays, such a gradient of density must be obtained by controlling the voltage of impression so that difficult problems are unavoidably encountered in connection with the temperature dependency of the threshold voltage and the voltage dependency of the speed of response. In contrast thereto, the desired gradient of density can be easily obtained in the liquid-crystal display unit utilizing the optoswitching effect of the $S_C^*$ phase by controlling the reversal time of the polarity so that the display units of this type are particularly suitable for graphic displays and the like.

SUMMARY OF THE INVENTION

The present invention accordingly has an object to provide a ferroelectric liquid-crystalline polymeric composition having excellent high-speed responsivity along with excellent shape retainability.

Thus, the ferroelectric liquid-crystalline polymeric composition of the invention comprises, in admixture:

(A) a non-liquid-crystalline polymeric compound having a proton donor and/or a proton acceptor in the molecular structure; and (B) a low-molecular liquid-crystalline compound having a proton donor and/or a proton acceptor in the molecular structure and having a chiral smectic C phase.

DETAILED DESCRIPTION OF THE PREFERRED EMBODIMENTS

The very scope of the present invention is to provide a ferroelectric liquid crystalline polymeric composition prepared by blending a low-molecular liquid-crystalline compound having a functional group capable of forming a hydrogen bond and having a chiral smectic C phase with a non-liquid-crystalline polymeric compound having one or more of functional groups capable of forming a hydrogen bond in the molecular structure. In other words, it is essential that the non-liquid-crystalline polymeric compound has a functional group capable of forming a hydrogen bond with the functional group of the low-molecular liquid-crystalline compound blended therewith.

A hydrogen bond is formed usually between a proton donor and a proton acceptor and exemplarily expressed, for example, by the formula

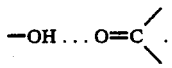

The strength of a hydrogen bond is usually low with a bond energy of 2 to 8 kcal/mole.

The functional group capable of forming a hydrogen bond is not particularly limitative provided that a proton donor and/or a proton acceptor are included therein. Examples of suitable functional groups forming a hydrogen bond include

—OH, —COOH, —CONH—, —NH$_2$, —CO—O—CO— and the like, of which

is a proton acceptor and —OH is a proton donor which while —COOH is a functional group having both of a proton donor and a proton acceptor.

Various kinds of polymers can be used as the non-liquid-crystalline polymeric compound having such a functional group capable of forming a hydrogen bond. Examples of suitable polymers include poly(acrylic acid), poly(methacrylic acid), polyacrylates, polymethacrylates, polyacrylamide, polyvinyl alcohol, polyvinyl acetate, polycarbonate, polyesters obtained by the condensation reaction of a dicarboxylic acid derivative and a diol derivative, polyamides obtained by the condensation reaction of a dicarboxylic acid derivative and a diamine derivative, polyamides obtained by the condensation reaction of a dicarboxylic acid derivative and a monoalcohol or monoamine derivative and the like.

The functional groups capable of forming a hydrogen bond can be a part of the main chain structure or a part of the side chains or pendant groups. It is preferable that both of the main chain and the pendant groups have these functional groups. The above mentioned non-liquid-crystalline polymeric compounds can be used either singly or as a combination of two kinds or more according to need. Polyesters and polycarbonates are preferred among the above named non-liquid-crystalline polymeric compounds.

The non-liquid-crystalline polymeric compound as the component (A) of the inventive composition should have an average degree of polymerization in the range from 10 to 10,000 or, preferably, in the range from 100 to 2000. When the average degree of polymerization of the polymer is too low, the liquid-crystalline polymeric composition compounded with the polymer may be somewhat inferior in respect of the shape retainability. When the average degree of polymerization of the polymer is too high, on the other hand, the polymeric liquid-crystalline composition compounded therewith may be somewhat inferior in the workability or processability.

In the following, a description is given of the low-molecular liquid-crystalline compound used as the component (B) of the inventive composition. The low-molecular liquid-crystalline compound characteristically has a ferroelectric chiral smectic C phase ($S_C^*$ phase).

The low-molecular liquid-crystalline compound used as the component (B) in the inventive composition can be prepared by the reaction of an optically active alcoholic compound and an optically active carboxylic acid. Examples of suitable optically active alcoholic compound include (R)-2-fluoro-1-hexyl alcohol, (S)-2-fluoro-1-hexyl alcohol, (R)-2-fluoro-1-heptyl alcohol, (S)-2-fluoro-1-heptyl alcohol, (R)-2-fluoro-1-octyl alcohol, (S)-2-fluoro-1-octyl alcohol, (R)-2-fluoro-1-decyl alcohol, (S)-2-fluoro-1-decyl alcohol, (R)-2-fluoro-1-nonyl alcohol, (S)-2-fluoro-1-nonyl alcohol, (R)-2-methyl butyl alcohol, (S)-2-methyl butyl alcohol, (R)-2-chlorobutyl alcohol, (S)-2-chlorobutyl alcohol, (R)-2-methyl pentyl alcohol, (S)-2-methyl pentyl alcohol, (R)-3-methyl pentyl alcohol, (S)-3-methyl pentyl alcohol, (R)-4-methyl hexyl alcohol, (S)-4-methyl hexyl alcohol, (R)-2-chloropropyl alcohol, (S)-2-chloropropyl alcohol, (R)-1-methyl heptyl alcohol, (S)-1-methyl heptyl alcohol, (R)-6-methyl octyl alcohol, (S)-6-methyl octyl alcohol, (2S,3S)-2-chloro-3-methyl-1-pentyl alcohol, (2S,3S)-2-fluoro-3-methyl-1-pentyl alcohol, (2S,3S)-2-bromo-3-methyl-1-pentyl alcohol, (3S,4S)-3-chloro-4-methyl-1-hexyl alcohol, (4S,5S)-4-chloro-5-methyl-1-heptyl alcohol, (5S,6S)-5-chloro-6-methyl-1-octyl alcohol, (6S,7S)-6-chloro-7-methyl-1-nonyl alcohol and the like.

Further, examples of the optically active carboxylic acid include (2S,3S)-2-chloro-3-methyl-1-pentanoic acid, (2S,3S)-2-fluoro-3-methyl-1-pentanoic acid, (2S,3S)-2-bromo-3-methyl-1-pentanoic acid, (R)-1-methyl butanoic acid, (S)-1-methyl butanoic acid and the like.

The low-molecular liquid-crystalline compound used as the component (B) in the inventive composition is a liquid-crystalline compound having a proton donor and/or a proton acceptor in the molecule and having the $S_C^*$ phase and represented by the general formula

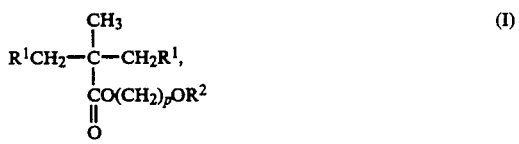

in which $R^1$ is —OH or —O—CO—CH$_3$, p is a positive integer not exceeding 20 and $R^2$ is a group selected from the class consisting of —Pn—Pn—Z—$R^3$, —Pn—CO—O—Pn—Z—$R^3$, —Pn—CO—O—Pn—Pn—Z—$R^3$ and —Pn—Pn—CO—O—Pn—Z—$R^3$, Pn being a 1,4-phenylene group, Z being —CO—O— or —O—CO— and $R^3$ being a group expressed by the formula $$-(CH_2)_n-\overset{*}{C}HR^4-(CH_2)_mCH_3, \quad (a)$$

or $$-(CH_2)_n-\overset{*}{C}HX-\overset{*}{C}H(CH_3)-C_2H_5, \quad (b)$$

where n is zero or a positive integer not exceeding 5, m is a positive integer not exceeding 6, $R^4$ is a methyl group or a halogen atom, X is a halogen atom and C* is an asymmetric carbon atom.

In the following, several synthetic routes are described for the preparation of the low-molecular liquid-crystalline compound represented by the above given general formula (I).

[1] When $R^2$ is —Pn—Pn—Z$R^3$ (i) When Z is —CO—O—

Acetyl chloride is reacted with 4'-hydroxy biphenyl carboxylic acid expressed by the structural formula (1) to give 4'-acetoxy biphenyl carboxylic acid expressed by the structural formula (2) according to the following reaction equation.

$$CH_3COCl + HO-Pn-Pn-CO-OH \quad (1)$$

$$\longrightarrow CH_3COO-Pn-Pn-CO-OH \quad (2)$$

In the next place, as is shown by the following equation, 4'-acetoxy biphenyl carboxylic acid expressed by the structural formula (2) is converted into 4'-acetoxy biphenyl carboxyl chloride expressed by the structural formula (2)-1 which is then reacted with a compound having a group denoted by $R^3$.

$$CH_3COO-Pn-Pn-CO-OH \rightarrow CH_3COO-Pn-Pn-COCl \quad (2)-1$$

On the other hand, the compound expressed by the above given structural formula (1) is directly reacted with a compound having a group denoted by $R^3$.

That is, the compound expressed by the above given structural formula (1) or (2)-1 is reacted with a compound having a group denoted by $R^3$ to give the compound expressed by the structural formula (3)-1, when $R^3$ is the group expressed by the formula (a) with n equal to zero, formula (3)-2, when $R^3$ is the group expressed by the formula (a) with n being a positive integer not exceeding 5, or formula (4)-1, when $R^3$ is the group expressed by the formula (b) with n being a positive integer not exceeding 5, according to the reaction equations respectively given below.

The compound of the formula (3)-2 is directly obtained by using 4'-hydroxy biphenyl carboxylic acid expressed by the structural formula (1) in place of 4'-acetoxy biphenyl carboxyl chloride expressed by the structural formula (2)-1.

$$CH_3COO\text{-}Pn\text{-}Pn\text{-}COCl + HO-\overset{*}{C}HR^4-(CH_2)_mCH_3 \longrightarrow \quad (3)\text{-}1$$

$$CH_3COO\text{-}Pn\text{-}Pn\text{-}CO-O-\overset{*}{C}HR^4-(CH_2)_mCH_3$$

$$HO\text{-}Pn\text{-}Pn\text{-}CO-OH + \quad (3)\text{-}2$$

$$HO-(CH_2)_n-\overset{*}{C}HR^4-(CH_2)_mCH_3 \longrightarrow$$

$$HO\text{-}Pn\text{-}Pn\text{-}CO-O-(CH_2)_m-\overset{*}{C}HR^4-(CH_2)_mCH_3$$

$$CH_3COO\text{-}Pn\text{-}Pn\text{-}COCl + \quad (4)\text{-}1$$

$$HO-(CH_2)_n-\overset{*}{C}HX-\overset{*}{C}H(CH_3)-C_2H_5 \longrightarrow$$

$$CH_3COO\text{-}Pn\text{-}Pn\text{-}CO-O-(CH_2)_n-\overset{*}{C}HX-\overset{*}{C}H(CH_3)-C_2H_5$$

The compound having an acetoxy group at the molecular end and expressed by the formula (3)-1 and (4)-1 can be reacted with benzyl amine and the like to be converted into a compound having a hydroxy group at the molecular end and expressed by the following structural formula (3)-3 or (4)-2, respectively.

$$CH_3COO\text{-}Pn\text{-}Pn\text{-}CO-O-\overset{*}{C}HR^4-(CH_2)_mCH_3 \longrightarrow \quad (3)\text{-}3$$

$$HO\text{-}Pn\text{-}Pn\text{-}CO-O-\overset{*}{C}HR^4-(CH_2)_mCH_3$$

$$CH_3COO\text{-}Pn\text{-}Pn\text{-}CO-O-(CH_2)_n-\overset{*}{C}HX-\overset{*}{C}H(CH_3)-C_2H_5 \longrightarrow \quad (4)\text{-}2$$

$$HO\text{-}Pn\text{-}Pn\text{-}CO-O-(CH_2)_n-\overset{*}{C}HX-\overset{*}{C}H(CH_3)-C_2H_5$$

In this manner, a compound represented by the general formula $$HO-Pn-Pn-ZR^3, \quad (5)$$

in which Z is —CO—O—, can be obtained.

(ii) When Z is —O—CO—

Acetyl chloride is reacted with 4,4'-dihydroxy biphenyl to give 4-hydroxy-4'-acetoxy biphenyl expressed by the structural formula (6) according to the reaction equation given below.

$$CH_3COCl + HO-Pn-Pn-OH \longrightarrow CH_3COO-Pn-Pn-OH \quad (6)$$

4-Hydroxy-4'-acetoxy biphenyl of the formula (6) is then reacted with a compound having a group denoted by $R^3$ to give the compound expressed by the structural formula (7) or (8) given below.

$$CH_3COO-Pn-Pn-OH + \quad (7)$$

$$HO-CO-(CH_2)_n-\overset{*}{C}HR^4-(CH_2)_mCH_3 \longrightarrow$$

$$CH_3COO-Pn-Pn-O-CO-(CH_2)_n-\overset{*}{C}HR^4-(CH_2)_mCH_3$$

-continued $$CH_3COO-Pn-Pn-OH + \quad (8)$$
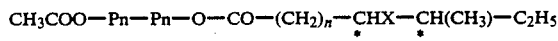
$$CH_3COO-Pn-Pn-O-CO-(CH_2)_n-\overset{*}{C}HX-\overset{*}{C}H(CH_3)-C_2H_5$$

The compound having an acetoxy group at the molecular end and expressed by the formula (7) or (8) is then reacted with benzyl amine and the like to be converted into a compound having a hydroxy group at the molecular end and expressed by the formula (9) or (10) given below.

$$CH_3COO\text{-}Pn\text{-}Pn\text{-}O-CO-(CH_2)_n-\overset{*}{C}HR^4-(CH_2)_mCH_3 \xrightarrow{(9)}$$

$$HO\text{-}Pn\text{-}Pn\text{-}O-CO-(CH_2)_n-\overset{*}{C}HR^4-(CH_2)_mCH_3$$

$$CH_3COO\text{-}Pn\text{-}Pn\text{-}O-CO-(CH_2)_n-\overset{*}{C}HX-\overset{*}{C}H(CH_3)-C_2H_5 \xrightarrow{(10)}$$

$$HO\text{-}Pn\text{-}Pn\text{-}O-CO-(CH_2)_n-\overset{*}{C}HX-\overset{*}{C}H(CH_3)-C_2H_5$$

In this manner, a compound represented by the general formula (5) given above, in which Z is —O—CO—, can be obtained.

In the next place, the compound represented by the general formula (5), in which Z is —CO—O— or —O—CO—, and obtained according to the procedure described in (i) or (ii), respectively, above is reacted with an α,ω-alkylene dihalide of the formula $X(CH_2)_pX$, in which X and p each have the same meaning as defined above, to give a compound expressed by the formula (11) shown below.

$$HO\text{-}Pn\text{-}Pn\text{-}ZR^3 + X(CH_2)_pX \longrightarrow X(CH_2)_pO\text{-}Pn\text{-}Pn\text{-}ZR^3 \quad (11)$$

Further, the compound of the formula (11) is reacted with 2,2-di(hydroxymethyl) propionic acid to give a compound expressed by the formula (12) shown below. This compound of the formula (12) is a compound represented by the general formula (I), in which $R^1$ is —OH.

$$X(CH_2)_pO\text{-}Pn\text{-}Pn\text{-}ZR^3 + HOCH_2-\underset{\underset{COOH}{|}}{\overset{\overset{CH_3}{|}}{C}}-CH_2OH \longrightarrow \quad (12)$$

$$HOCH_2-\underset{\underset{COO(CH_2)_pO\text{-}Pn\text{-}Pn\text{-}ZR^3}{|}}{\overset{\overset{CH_3}{|}}{C}}-CH_2OH$$

On the other hand, a compound represented by the general formula (I), in which $R^1$ is —O—CO—$CH_3$, and expressed by the following formula (13) can be obtained by the reaction of the compound expressed by the above given formula (12) with acetic anhydride according to the equation below.

$$HOCH_2-\underset{\underset{COO(CH_2)_pO\text{-}Pn\text{-}Pn\text{-}ZR^3}{|}}{\overset{\overset{CH_3}{|}}{C}}-CH_2OH + (CH_3COO)_2O \longrightarrow \quad (13)$$

$$CH_3COOCH_2-\underset{\underset{COO(CH_2)_pO\text{-}Pn\text{-}Pn\text{-}ZR^3}{|}}{\overset{\overset{CH_3}{|}}{C}}-CH_2OCOCH_3$$

[2] When $R^2$ is —Pn—CO—O—Pn—$ZR^3$ (i) When Z is —CO—O—

As is shown by the following equation, 4-acetoxy benzoic acid is converted into 4-acetoxy benzoyl chloride which is then reacted with a compound having a group of the formula (a) as the group $R^3$ to give a compound expressed by the structural formula (14) shown below. Similarly, the reaction of 4-acetoxy benzoyl chloride with a compound having the group expressed by the formula (b) as the group $R^3$ gives a compound expressed by the structural formula (15) shown below.

$$CH_3COO\text{-}Pn\text{-}COOH \longrightarrow CH_3COO\text{-}Pn\text{-}COCl$$

$$CH_3COO\text{-}Pn\text{-}COCl + HO-(CH_2)_n-\overset{*}{C}HR^4-(CH_2)_mCH_3 \longrightarrow \quad (14)$$

$$CH_3COO\text{-}Pn\text{-}CO-O-(CH_2)_n-\overset{*}{C}HR^4-(CH_2)_mCH_3$$

$$CH_3COO\text{-}Pn\text{-}COCl + \quad (15)$$
$$HO-(CH_2)_n-\overset{*}{C}HX-\overset{*}{C}H(CH_3)-C_2H_5 \longrightarrow$$
$$CH_3COO\text{-}Pn\text{-}CO-O-(CH_2)_n-\overset{*}{C}HX-\overset{*}{C}H(CH_3)-C_2H_5$$

The compound having an acetoxy group at the molecular end and expressed by the formula (14) or (15) is reacted with benzyl amine and the like to give a compound having a group denoted by $R^2$ and represented by the general formula HO—Pn—CO—O—$R^3$.

(ii) When Z is —O—CO—

Acetyl chloride is reacted with hydroquinone to give 4-acetoxy phenol expressed by the formula (16) shown below.

$$CH_3COCl + HO-Pn-OH \rightarrow CH_3COO-Pn-OH \quad (16)$$

4-Acetoxy phenol of the formula (16) is then reacted with a compound having a group expressed by the formula (a) or (b) as the group $R^3$ to give a compound expressed by the following structural formula (17) or (18), respectively.

$$CH_3COO\text{-}Pn\text{-}OH + \quad (17)$$
$$HO-CO-(CH_2)_n-\overset{*}{C}HR^4-(CH_2)_m-CH_3 \longrightarrow$$
$$CH_3COO\text{-}Pn\text{-}O-CO-(CH_2)_n-\overset{*}{C}HR^4-(CH_2)_m-CH_3$$

$$CH_3COO\text{-}Pn\text{-}OH + \quad (18)$$
$$HO-CO-(CH_2)_n-\overset{*}{C}HX-\overset{*}{C}H(CH_3)-C_2H_5 \longrightarrow$$

-continued $$CH_3COO-Pn-O-CO-(CH_2)_n-CHX-CH(CH_3)-C_2H_5$$

The compound having an acetoxy group at the molecular end and expressed by the formula (17) or (18) is reacted with benzyl amine and the like to give a compound having a group denoted by $R^2$ and represented by the general formula $HO-Pn-O-CO-R^3$.

While a compound represented by the general formula (I) is derived from a compound expressed by the formula $$HO-Pn-ZR^3, \quad (19)$$

which is $HO-Pn-CO-O-R^3$ or $HO-Pn-O-CO-R^3$ obtained by the procedures (i) or (ii), respectively, described above, this process is preceded by the reaction of an $\alpha,\omega$-alkylene dihalide and benzyl 4-hydroxy benzoate to give a compound expessed by the formula (20) according to the following equation.

$$X(CH_2)_pX + HO-Pn-COOCH_2-Pn \longrightarrow \qquad (20)$$
$$X(CH_2)_pO-Pn-COOCH_2-Pn$$

Further, the compound expressed by the formula (20) is subjected to a reducing reaction and converted into a compound expressed by the formula (21) shown below.

$$X(CH_2)_pO-Pn-COOCH_2-Pn \longrightarrow X(CH_2)_pO-Pn-COOH \qquad (21)$$

The compound expressed by the formula (21) is converted into an acid chloride which is then reacted with the compound expressed by the formula (19), i.e. $HO-Pn-ZR^3$, to give a compound expressed by the formula (22) according to the reaction equation shown below.

$$X(CH_2)_pO-Pn-COCl + HO-Pn-ZR^3 \longrightarrow \qquad (22)$$
$$X(CH_2)_pO-Pn-COO-Pn-ZR^3$$

The compound of the formula (22) is then reacted with 2,2-di(hydroxymethyl) propionic acid according to the following reaction equation to give a compound expressed by the structural formula (23).

$$\begin{array}{c} CH_3 \\ | \\ HOCH_2-C-CH_2OH \\ | \\ COOH \end{array} + X(CH_2)_pO-Pn-COO-Pn-ZR^3 \longrightarrow \qquad (23)$$

$$\begin{array}{c} CH_3 \\ | \\ HOCH_2-C-CH_2OH \\ | \\ COO(CH_2)_pO-Pn-COO-Pn-ZR^3 \end{array}$$

This compound of the formula (23) is a compound represented by the general formula (I), in which $R^1$ is $-OH$. A compound represented by the general formula (I), in which $R^1$ is $-O-CO-CH_3$, can be obtained, in a manner similar to the preparation of the compound expressed by the formula (13), by the reaction of the compound expressed by the formula (23) with acetic anhydride.

[3] When $R^2$ is $-Pn-CO-O-Pn-Pn-ZR^3$

A compound expressed by the above given formula (21) is converted into an acid chloride which is then reacted with the compound expressed by the above given formula (5) according to the following reaction equation to give a compound expressed by the formula (24).

$$X(CH_2)_pO-Pn-COCl + HO-Pn-Pn-ZR^3 \longrightarrow \qquad (24)$$
$$X(CH_2)_pO-Pn-COO-Pn-Pn-ZR^3$$

Further, the compound expressed by the formula (24) is reacted with 2,2-di(hydroxymethyl) propionic acid according to the following reaction equation to give a compound expressed by the formula (25).

$$\begin{array}{c} CH_3 \\ | \\ HOCH_2-C-CH_2OH \\ | \\ COOH \end{array} + \qquad (25)$$

$$X(CH_2)_pO-Pn-COO-Pn-Pn-ZR^3 \longrightarrow$$

$$\begin{array}{c} CH_3 \\ | \\ HOCH_2-C-CH_2OH \\ | \\ COO(CH_2)_pO-Pn-COO-Pn-Pn-ZR^3 \end{array}$$

This compound expressed by the formula (25) is the compound represented by the general formula (I), in which $R^1$ is $-OH$. The compound represented by the general formula (I) in which $R^1$ is $-O-CO-CH_3$ can be obtained by the reaction of the compound expressed by the formula (25) with acetic anhydride in a similar manner to the preparation of the compound expressed by the formula (13) described before. [4] When $R^2$ is $-Pn-Pn-CO-O-Pn-ZR^3$ 4'-Hydroxy biphenyl carboxylic acid is reacted with benzyl bromide according to the following reaction equation to give a compound expressed by the formula (26).

$$HO-Pn-Pn-COOH + BrCH_2-Pn \longrightarrow \qquad (26)$$
$$HO-Pn-Pn-COOCH_2-Pn$$

This compound expressed by the formula (26) is reacted with an $\alpha,\omega$-alkylene dihalide according to the following reaction equation to give a compound expressed by the formula (27).

$$X(CH_2)_pX + HO-Pn-Pn-COOCH_2-Pn \longrightarrow \qquad (27)$$
$$X(CH_2)_pO-Pn-Pn-COOCH_2-Pn$$

This compound expressed by the formula (27) is subjected to a reducing reaction to give a compound expressed by the formula (28) shown below, which is then converted into an acid chloride expressed by the formula (29) shown below.

$$X(CH_2)_pO-Pn-Pn-COOCH_2-Pn \longrightarrow$$

-continued

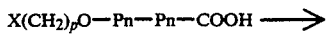

(28)

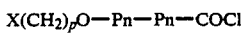

(29)

This compound expressed by the formula (29) is then reacted with the compound expressed by the formula (19) according to the following reaction equation to give a compound expressed by the formula (30).

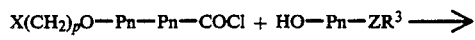

(19)

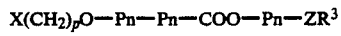

(30)

This compound expressed by the formula (30) is then reacted with 2,2-di(hydroxymethyl) propionic acid according to the following reaction equation to give a compound expressed by the formula (31).

 (31)

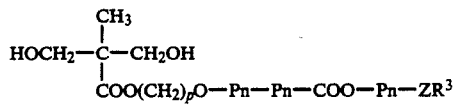

This compound expressed by the formula (31) is the compound represented by the general formula (I), in which $R^1$ is —OH. The compound represented by the general formula (I), in which $R^1$ is —O—CO—CH$_3$, can be obtained by the reaction of the compound expressed by the formula (31) with acetic anhydride in the same manner as described above.

The above described procedures are the typical synthetic routes for the preparation of the compounds represented by the general formula (I).

The ferroelectric liquid-crystalline polymeric composition of the present invention can be obtained by uniformly mixing the non-liquid-crystalline polymeric compound and the low-molecular liquid-crystalline compound described above. Taking the number of the proton donor and/or proton acceptor in the non-liquid-crystalline polymeric compound as A and taking the number of the proton donor and/or proton acceptor at the molecular end of the low-molecular liquid-crystalline compound as B, the non-liquid crystalline polymeric compound and the low-molecular liquid-crystalline compound is blended in such a proportion that the ratio of A:B is in the range from 10:1 to 1:2 or, preferably, in the range from 6:1 to 1:1 or, more preferably, in the range from 3:1 to 1:1.

The blending work of the non-liquid-crystalline polymeric compound and the low-molecular liquid-crystalline compound can be performed conveniently by dissolving each of the components in an organic solvent and mixing the solutions with agitation followed by evaporation of the solvent to concentrate the solution or to evaporate the solvent to dryness. Examples of suitable organic solvents include lower alcohols such as methyl alcohol, ethyl alcohol and the like, ketones such as acetone, methyl ethyl ketone and the like, tetrahydrofuran and chlorinated hydrocarbon solvents such as chloroform, methylene chloride, carbon tetrachloride and the like.

Heating of the solutions is not always necessary in performing the blending work. It is possible to obtain the inventive composition in the form of a sheet, film, block and the like having dimensions as desired by casting the blend of the solutions in a mold followed by evaporation of the solvent.

Following are Preparation Examples of the non-liquid-crystalline polymeric compounds used as the component (A) in the inventive ferroelectric liquid-crystalline polymeric composition.

PREPARATION EXAMPLE 1

Preparation of a Polyester

A solution of 1 m mole of 2,2-di(hydroxymethyl) propionic acid and 1 m mole of triethyl amine in 50 ml of tetrahydrofuran was agitated at room temperature and a solution of 1 m mole of sebacoyl chloride in 10 ml of tetrahydrofuran was added thereto dropwise to form a reaction mixture which was heated and agitated for 12 hours at 80° C. Thereafter, the reaction mixture was poured into a large volume of acetone to terminate the polycondensation reaction. The mixture was concentrated by evaporating the solvent followed by addition of methyl alcohol to precipitate a polymer which was a polyester composed of the recurring units expressed by the following formula. The conversion of the starting compounds into the polymer was 83% and the polymer had a weight-average molecular weight $M_w$ of about 9000.

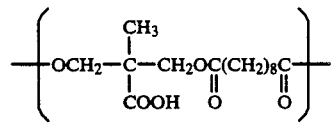

PREPARATION EXAMPLE 2

Preparation of a Polyester

A solution of 1 m mole of 1,6-hexane diol and 1 m mole of triethyl amine in 50 ml of tetrahydrofuran was agitated at room temperature and a solution of 1 m mole of sebacoyl chloride in 10 ml of tetrahydrofuran was added thereto dropwise to form a reaction mixture which was heated and agitated for 12 hours at 80° C. Thereafter, the reaction mixture was poured into a large volume of acetone to terminate the polycondensation reaction. The mixture was concentrated by evaporating the solvent followed by addition of methyl alcohol to precipitate a polymer which was a polyester composed of the recurring units expressed by the following formula. The conversion of the starting compounds into the polymer was 75% and the polymer had a weight-average molecular weight $M_w$ of about 10,000.

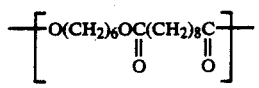

Following are Synthetic Examples of the low-molecular liquid-crystalline compounds used as the component (B) in the inventive ferroelectric liquid-crystalline polymeric composition.

SYNTHETIC EXAMPLE 1

(1) Synthesis of 2-methylbutyl 4'-hydroxy biphenyl-4-carboxylate.

Into 150 ml of benzene were added 20 g (93 m moles) of 4'-hydroxy biphenyl-4-carboxylic acid, 41 g (467 m moles) of (S)-(-)-2-methyl butyl alcohol and 2 ml of concentrated sulfuric acid and the mixture was heated under reflux by using a Dean-Stark for 24 hours to effect the esterification reaction. After completion of the reaction, the reaction mixture was concentrated by evaporating the solvent. The thus obtained product was subjected to recrystallization from a solvent mixture of toluene and hexane to give an ester of (1). The yield of the product was 98% of thetheoretical value and the product had a specific rotatory power of $[\alpha]_D = +4.25$ (CHCl$_3$).

(2) Synthesis of 2-methylbutyl 4'-(10-bromodecyloxy) biphenyl-4-carboxylate

A reaction mixture was prepared by adding 30 m moles of the ester product obtained in (1) described above, 60 m moles of 1,10-dibromodecane and 120 m moles of potassium carbonate to 150 ml of acetone and the reaction mixture was heated under reflux for 6 hours. After completion of the reaction, the reaction mixture was filtered and concentrated by evaporating the solvent. The thus obtained product was purified by column chromatography to give the ester compound of (2). The yield of the product was 88% of the theoretical value and the polymer had a specific rotatory power of $[\alpha]_D = +2.44$ (CHCl$_3$).

(3) Synthesis of 2-methylbutyl 4'-[10-(2,2-dihydroxymethyl propionyl)oxy decyloxy] biphenyl-4-carboxylate A solution was prepared by dissolving 18 m moles of 2,2-di(hydroxymethyl) propionic acid and 20 m moles of tetramethyl ammonium hydroxide pentahydrate in 100 ml of dimethyl formamide and the solution was agitated for 2 hours. Thereafter, 18.0 m moles of the ester compound obtained in (2) above were added to the solution and agitation was continued for further 6 hours. The reaction mixture was admixed with 100 ml of water followed by extraction with ether. The ether extract was dried and concentrated by evaporating the solvent followed by purification by column chromatography to give an ester compound of (3). The yield of the product was 67% of the theoretical value and the product had a specific rotatory power of $[\alpha]_D = +2.11$ (CHCl$_3$).

(4) Synthesis of 2-methylbutyl 4'-[10-(2,2-diacetoxymethyl) propionyloxy decyloxy] biphenyl 4-carboxylate.

A solution was prepared by dissolving 7.5 m moles of the ester compound obtained in (3) described above and 45 m moles of acetic anhydride in 5 ml of pyridine and the solution was agitated for 12 hours at room temperature. The reaction mixture was then subjected to extraction with ether and the ether extract was washed with diluted hydrochloric acid, dried and concentrated by evaporating the solvent followed by purification by column chromatography to give a low-molecular liquid-crystalline compound used as the component (B) in the inventive ferroelectric liquid-crystalline polymeric composition. The yield of the compound was 85% of the theoretical value and the compound had a specific rotatory power of $[\alpha]_D = +2.31$ (CHCl$_3$).

The phase transition behavior of this low-molecular liquid-crystalline compound was as shown below according to the results of the examination by DSC and a polarizing microscope.

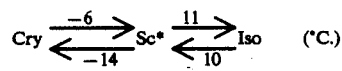

In the above given scheme of phase transition and hereinafter, Cry is a crystalline state, S$_C$* is a chiral smectic C phase and Iso is the isotropic phase.

SYNTHETIC EXAMPLE 2

(1) Synthesis of 2-methylbutyl 4-hydroxy benzoate.

A reaction mixture was prepared by adding 90 m moles of 4-hydroxy benzoic acid and 360 m moles of 2-methyl butyl alcohol to 150 ml of toluene together with 2 ml of concentrated sulfuric acid and the dehydration reaction was performed by agitating the reaction mixture for 25 hours. After concentration by evaporating the solvent, the reaction mixture was subjected to purification by column chromatography to give an ester compound of (1). The yield of the produce was 95% of the theoretical value and the compound had a specific rotatory power of $[\alpha]_D = +4.85$ (CHCl$_3$).

(2) Synthesis of benzyl 4-(12-bromododecyloxy) benzoate

A reaction mixture was prepared by adding 150 m moles of 1,12-dibromododecane, 50 m moles of benzyl 4-hydroxy benzoate and 0.3 mole of potassium carbonate of 500 ml of acetone and the reaction mixture was heated for 6 hours under reflux. The reaction mixture was filtered and concentrated by evaporating the solvent followed by purification by column chromatography to give an ester compound of (2) in a yield of 82% of the theoretical value.

(3) Synthesis of 4-(12-bromododecyloxy) carboxylic acid

A reaction mixture was prepared by adding 100 m moles of the ester compound obtained in (2) above and 2.0 g of a palladium carbon catalyst containing 5% of palladium to 150 ml of ethyl acetate and agitated for 5 hours under an atmosphere of hydrogen gas. After completion of the reaction, the reaction mixture was filtered and concentrated by evaporating the solvent followed by purification by column chromatography to give a carboxylic acid of (3). The yield of the product was 98% of the theoretical value.

(4) Synthesis of 2-methylbutyl 4-(4'-(12-bromododecyloxy) benzoyloxy] benzene -4-carboxylate A solution prepared by dissolving 80 m moles of the carboxylic acid obtained in (3) described above in 30 ml of toluene was admixed with 10 ml of thionyl chloride and agitated for 2 hours at 80° C. After completion of the reaction, the reaction mixture was freed from excess of thionyl chloride and toluene by distillation under reduced pressure to give an acid chloride. This acid chloride was dissolved in tetrahydrofuran and the solution was added dropwise under agitation to a solution of 90 m moles of the ester compound obtained in (1) described aboe and 100 m moles of triethyl amine in 200 ml of tetrahydrofuran and the mixture was agitated for 8 hours. After completion of the reaction, the reaction mixture was subjected to extraction with ether and the ether extract was washed with hydrochloric acid, dried and concentrated by evaporating the solvent followed by purification by column chromatography to give an ester compound of (4) as the product. The yield of the product was 81% of the theoretical value and the ster compound had a specific rotatory power of $[\alpha]_D = +2.65$ (CHCl$_3$).

(5) Synthesis of 2-methylbutyl 4-[4'-{12-(2,2-diacetoxymethyl propionyloxy) dodecyloxy} benzoyloxy] benzene-4-carboxylate as a low-molecular liquid-crystalline compound A solution was prepared by dissolving 18.0 m moles of 2,2-di(hydroxymethyl) propionic acid and 20.0 m moles of tetramethyl ammonium hydroxide pentahydrate in 150 ml of dimethyl formamide and the solution was agitated for 2 hours. Thereafter, 28 m moles of the ester compound obtained in (4) described above were added thereto and the mixture was further agitated for additional 6 hours. The reaction mixture was then admixed with 200 ml of water and subjected to extraction with ether. The ether extract was dried and concentrated by evaporating the solvent followed by purification by column chromatography to give a low-molecular liquid-crystalline compound suitable for use as the component (B) in the inventive composition. The yield of the product was 58% of the theoretical value and the product had a specific rotatory power of $[\alpha]_D = +2.08$ (CHCl$_3$). This low-molecular liquid-crystalline compound exhibited a behavior of phase transition shown by the following scheme, in which S$_A$ is the smectic A phase.

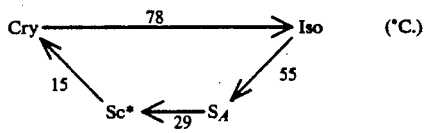

SYNTHETIC EXAMPLE 3

Synthesis of 2-methylbutyl 4-[4'-(12-(2,2-diacetoxy-methyl propionyloxy) dodecyloxy} benzoyloxy] benzene-4-carboxylate as a low-molecular liquid-crystalline compound A reaction mixture was prepared by adding 7.5 m moles of the low-molecular liquid-crystalline compound obtained in (5) of Synthetic Example 2 and 45 m moles of acetic anhydride to 5 ml of pyridine and the mixture was agitated at room temperature for 12 hours. After completion of the reaction, the reaction mixture was subjected to extraction with ether and the ether extract was washed with diluted hydrochloric acid, dried and concentrated by evaporating the solvent followed by purification by column chromatography to give a low-molecular liquid-crystalline compound having a terminal acetyl group suitable for use as the component (B) in the inventive composition. The yield of the product was 73% of the theoretical value and the product had a specific rotatory power of $[\alpha]_D = +2.15$ (CHCl$_3$). This compound exhibited a behavior of phase transition shown by the following scheme.

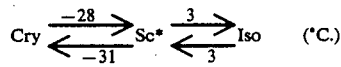

SYNTHETIC EXAMPLE 4

(1) Synthesis of 2-methylbutyl 4'-(4"-12-bromododecyloxy benzoyloxy) biphenyl-4-carboxylate A reaction mixture was prepared by mixing 50 m moles of the carboxylic acid obtained in (3) of Synthetic Example 2, 30 ml of toluene and 10 ml of thionyl chloride and the mixture was agitated at 80° C. for 2 hours. Thereafter, the reaction mixture was freed from excess of thionyl chloride and toluene by distillation under reduced pressure to give an acid chloride. This acid chloride was dissolved in tetrahydrofuran and the solution was added dropwise to a solution of 55 m moles of the ester compound obtained in (1) of Synthetic Example 1 and 60 m moles of triethyl amine in 200 ml of tetrahydrofuran under agitation which was continued for 8 hours. After completion of the reaction, the reaction mixture was subjected to extraction with ether and the ether extract was washed with diluted hydrochloric acid, dried and concentrated by evaporating the solvent followed by purification by column chromatography to give an ester compound of (1). The yield of the product was 73% of the theoretical value and the product had a specific rotatory power of $[\alpha]_D = +2.33$ (CHCl$_3$).

(2) Synthesis of 2-methylbutyl 4-[4"-12-(2,2-dihydroxymethyl propionyloxy) dodecyloxy} benzoyloxy] biphenyl-4-carboxylate as a low-molecular liquid-crystalline compound A reaction mixture was prepared by adding 18.0 m moles of 2,2-di(hydroxymethyl) propionic acid and 20.0 m moles of tetramethyl ammonium hydroxide pentahydrate to 150 ml of dimethyl formamide and the mixture was agitated for 2 hours. Thereafter, the mixture was admixed with 18.0 m moles of the ester compound obtained in (1) described above and agitated for additional 6 hours. After completion of the reaction, the reaction mixture was subjected to extraction with ether and the ether extract was dried and concentrated by evaporating the solvent followed by purification by column chromatography to give a low-molecular liquid-crystalline compound suitable for use as the component (B) in the inventive composition. The yield of the product was 78% of the theoretical value and the product compound had a specific rotatory power of $[\alpha]_D = +2.10$ (CHCl$_3$). This compound exhibited a behavior of phase transition shown by the following scheme.

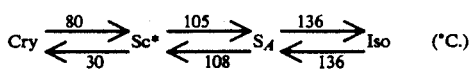  (°C.)

SYNTHETIC EXAMPLE 5

Synthesis of 2-methylbutyl 4′-[4″-{12-(2,2-diacetoxy methyl propionyloxy) dodecyloxy} benzoyloxy biphenyl-4-carboxylate as a low-molecular liquid-crystalline compound A reaction mixture was prepared by adding 7.5 m moles of the low-molecular liquid-crystalline compound obtained in (2) of Synthetic Example 4 and 45 m moles of acetic anhydride to 5 ml of pyridine and the reaction mixture was agitated for 12 hours at room temperature. After completion of the reaction, the reaction mixture was subjected to extraction with ether and the ether extract was washed with diluted hydrochloric acid, dried and concentrated by evaporating the solvent followed by purification by column chromatography to give a low-molecular liquid-crystalline compound having a terminal acetyl group suitable for use as the component (B) in the inventive composition. The yield of the product was 83% of the theoretical value and the compound had a specific rotatory power of $[\alpha]_D = +2.48$ (CHCl$_3$). This compound exhibited a behavior of phase transition shown by the following scheme.

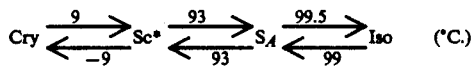  (°C.)

SYNTHETIC EXAMPLE 6

(1) Synthesis of benzyl 4′-hydroxy biphenyl-4-carboxylate

A solution was prepared by dissolving 0.1 mole of 4′-hydroxy biphenyl-4-carboxylic acid and 0.11 mole of tetramethyl ammonium hydroxide pentahydrate in 200 ml of dimethyl formamide and the solution was agitated for 2 hours. Then, the solution was further admixed with 0.1 mole of benzyl bromide and agitation was continued for additional 6 hours. After completion of the reaction, the reaction mixture was subjected to extraction with ether and the ether extract was dried and concentrated by evaporating the solvent followed by purification by column chromatography to give an ester compound of (1) in a yield of 76% of the theoretical value.

(2) Synthesis of benzyl 4′-(12-bromododecanyloxy) biphenyl-4-carboxylate

A reaction mixture was prepared by adding 70 m moles of the ester compound obtained in (1) described above, 0.21 mole of 1,12-dibromododecane and 0.4 mole of potassium carobnate to 1 liter of acetone and the mixture was heated for 6 horse under reflux. After completion of the reaction, the reaction mixture was filtered and the filtrate was concentrated by evaporating the solvent followed by purification by column chromatography to give an ester compound of (2) in a yield of 89% of the theoretical value.

(3) Synthesis of 4′-(12-bromododecanyloxy) biphenyl-4-carboxylic acid.

A reaction mixture was prepared by adding 60 m moles of the ester compound obtained in (2) described above and 2.0 g of a palladium carbon catalyst containing 5% of palladium to 500 ml of ethyl acetate and the reaction mixture was agitated for 24 hours under an atmosphere of hydrogen gas. After completion of the reaction, the reaction mixture was filtered and the filtrate was concentrated by evaporating the solvent followed by purification by column chromatography to give a carboxylic acid of (3) in a yield of 98% of the theoretical value.

(4) Synthesis of 2-methylbutyl 4-(4″-12-bromododecyloxy biphenyl-4′-benzoate) carboxylate A reaction mixture was prepared by mixing 50 m moles of the carboxylic acid obtained in (3) described above, 20 ml of toluene, 10 ml of chloroform and 10 ml of thionyl chloride and the reaction mixture was agitated at 80° C. for 2 hours. Thereafter, the reaction mixture was freed from excess of thionyl chloride, toluene and chloroform by distillation under reduced pressure to give an acid chloride. In the next place, this acid chloride was dissolved in tetrahydrofuran and the solution was added dropwise to a solution of 55 m moles of the ester compound obtained in (1) of Synthetic Example 2 and 60 m moles of triethyl amine in 200 ml of tetrahydrofuran under agitation to effect the reaction for 8 hours. After completion of the reaction, the reaction mixture was subjected to extraction with ether and the ether extract was washed with diluted hydrochloric acid, dried and concentrated by evaporating the solvent followed by purification by column chromatography to give an ester compound of (4). The yield of this compound was 82% of the theoretical value and the compound had a specific rotatory power of $[\alpha]_D = +2.09$ (CHCl$_3$).

(5) Synthesis of 2-methylbutyl 4-[4″-{12-(2,2-dihydroxymethyl propionyloxy) dodecyloxy} biphenyl-4′-carbonyloxy] benzoate as a low-molecular liquid-crystalline compound A reaction mixture was prepared by dissolving 18.0 m moles of 2,2-di(hydroxymethyl) propionic acid and 20.0 m moles of tetramethyl ammonium hydroxide pentahydrate in 150 ml of dimethyl formamide and the mixture was agitated for 2 hours. Then, the reaction mixture was admixed with 18.0 m moles of the ester compound obtained in (4) described above and further agitated for additional 6 hours to effect the reaction. After completion of the reaction, the reaction mixture was subjected to extraction with ether and the ether extract was dried and concentrated by evaporating the solvent followed by purification by column chromatography to give a low-molecular liquid-crystalline compound suitable for use as the component (B) in the inventive composition. The yield of the product was 63% of the theoretical value and the compound had a specific rotatory power of $[\alpha]_D = +2.10$ (CHCl$_3$). The compound exhibited a behavior of phase transition shown by the following scheme.

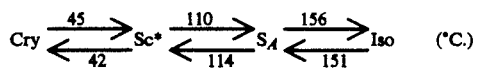  (°C.)

SYNTHETIC EXAMPLE 7

Synthesis of 2-methylbutyl 4-[4″-{12-(2,2-diacetoxy methyl propionyloxy) dodecyloxy} biphenyl-4′-carbonyloxy] benzoate as a low-molecular liquid-crystalline compound A reaction mixture was prepared by dissolving 7.5 m moles of the low-molecular liquid-crystalline compound obtained in (5) of Synthetic Example 6 and 45 m moles of acetic anhydride in 5 ml of pyridine and the reaction mixture was agitated for 12 hours at room temperature. After completion of the reaction, the reaction mixture was subjected to extraction with ether and the ether extract was washed with diluted hydrochloric acid, dried and concentrated by evaporating the solvent followed by purification by column chromatography to give a low-molecular liquid-crystalline compound having a terminal acetyl group and suitable for use as the component (B) in the inventive composition. The yield of this product was 69% of the theoretical value and the compound had a specific rotatory power of $[\alpha]_D = +2.10$ (CHCl$_3$). The compound exhibited a behavior of phase transition shown by the following scheme.

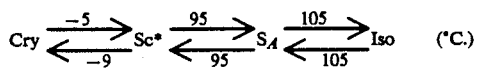

SYNTHETIC EXAMPLE 8

(1) Synthesis of 2-chloro-3-methylpentyl 4-acetoxy benzoate

A solution was prepared by dissolving 0.12 mole of 4-acetoxy benzoic acid and 15 ml of thionyl chloride in 70 ml of toluene and the solution was agitated at 80° C. Then, the reaction mixture was concentrated by removing excess of thionyl chloride and toluene as the solvent by distillation under reduced pressure to give an acid chloride. In the next place, this acid chloride was dissolved in tetrahydrofuran and the solution was added dropwise to a solution of 0.1 mole of (2S,3S)-2-chloro-3-methyl-1-pentyl alcohol and 0.12 mole of triethyl amine in 300 ml of tetrahydrofuran under agitation and the reaction mixture was agitated for 8 hours. After completion of the reaction, the reaction mixture was subjected to extraction with ether and the ether extract was washed with diluted hydrochloric acid, dried and concentrated by evaporating the solvent followed by purification by column chromatography to give an ester compound of (1). The yield of this product was 55% of the theoretical value and the compound had a specific rotatory power of $[\alpha]_D = +17.4$ (CHCl$_3$).

(2) Synthesis of 2-chloro-3-methylpentyl 4-hydroxy benzoate

A reaction mixture was prepared by dissolving 50 m moles of the ester compound obtained in (1) described above and 20 ml of benzyl amine in 300 ml of ether and the mixture was agitated for 2 hours to effect the reaction. After completion of the reaction, the reaction mixture was subjected to extraction with ether and the ether extract was dried and concentrated by evaporating the solvent followed by purification by column chromatography to give an ester compound of (2). The yield of this product was 95% of the theoretical value and the compound had a specific rotatory power of $[\alpha]_D = +12.8$ (CHCl$_3$).

(3) Synthesis of 2-chloro-3-methylpentyl 4-(4″-12-bromo dodecanyloxy biphenyl-4′-carbonyloxy) carboxylate A reaction mixture was prepared by mixing 50 m moles of the carboxylic acid obtained in (3) of Synthetic Example 6, 20 ml of toluene, 10 ml of chloroform and 10 ml of thionyl chloride and the mixture was agitated for 2 hours at 80° C. The reaction mixture was then freed from excess of thionyl chloride, toluene and chloroform by distillation under reduced pressure to give an acid chloride. In the next place, this acid chloride was dissolved in tetrahydrofuran and the solution was added dropwise to a solution of 55 m moles of the ester compound obtained in (2) described above and 60 m moles of triethyl amine in 200 ml of tetrahydrofuran under agitation followed by further continued agitation for 8 hours. After completion of the reaction, the reaction mixture was subjected to extraction with ether and the ether extract was washed with diluted hydrochloric acid, dried and concentrated by evaporating the solvent followed by purification by column chromatography to give an ester compound of (3). The yield of this product was 82% of the theoretical value and the compound had a specific rotatory power of $[\alpha]_D = +10.8$ (CHCl$_3$).

(4) Synthesis of 2-chloro-3-methylpentyl 4-[4″-{12-(2,2-dihydroxymethyl) propionyloxy} dodecanyloxy] biphenyl-4′-carbonyloxy carboxylate A reaction mixture was prepared by dissolving 18.0 m moles of 2,2-di(hydroxymethyl) propionic acid and 20.0 m moles of tetramethyl ammonium hydroxide pentahydrate in 150 ml of dimethyl formamide and the mixture was agitated for 2 hours. Then, the reaction mixture was admixed with 18.0 m moles of the ester compound obtained in (3) described above and further agitated for additional 8 hours. After completion of the reaction, the reaction mixture was subjected to extraction with ether and the ether extract was dried and concentrated by evaporating the solvent followed by purification by column chromatography to give an ester compound of (4). The yield of this product was 80% of the theoretical value and the compound had a specific rotatory power of $[\alpha]_D = +10.3$ (CHCl$_3$).

(5) Synthesis of 2-chloro-3-methylpentyl 4-[4″-{12-(2,2-diacetoxy methyl) propionyloxy} dodecyloxy] biphenyl-4′-benzoate carboxylate as a low-molecular liquid-crystalline compound A reaction mixture was prepared by dissolving 7.5 m moles of the ester compound obtained in (4) described above and 45 m moles of acetic anhydride in 5 ml of pyridine and the mixture was agitated for 12 hours at room temperature. After completion of the reaction, the reaction mixture was subjected to extraction with ether and the ether extract was washed with diluted hydrochloric acid, dried and concentrated by evaporating the solvent followed by purification by column chromatography to give a low-molecular liquid-crystalline compound suitable for use as the component (B) in the inventive composition. The yield of this product was 78% of the theoretical value and the compound had a specific rotatory power of $[\alpha]_D = +10.4$ (CHCl$_3$). This compound exhibited a behavior of phase transition shown by the following scheme.

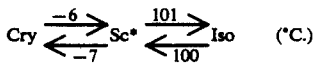

$$Cry \underset{-7}{\overset{-6}{\rightleftarrows}} Sc^* \underset{100}{\overset{101}{\rightleftarrows}} Iso \quad (^\circ C.)$$

EXAMPLES 1 to 8

Eight liquid-crystalline polymeric compositions were prepared in Examples 1 to 8 each by dissolving 0.42 m mole of the low-molecular liquid-crystalline compounds obtained in Synthetic Examples 1 to 8, respectively, and 0.50 g of the polyester obtained in Preparation Example 1 in methylene chloride. After thorough agitation, each of the solution was concentrated by evaporating the solvent and dried to give a film of the liquid-crystalline polymeric composition. Table 1 below summarizes the behavior of phase transition of each of the thus prepared liquid-crystalline polymeric compositions along with the behavior of phase transition of the low-molecular liquid-crystalline compound per se prior to blending with the polyester. Table 1 also shows the speed of electric-field response of each of the liquid-crystalline polymeric compositions measured according to the following procedure.

Measurement of Speed of Electric-Field Response

A sheet of the polymeric composition was sandwiched between a pair of ITO substrates each 20 mm by 10 mm wide held oppositely with a gap space of 25 μm thickness by using a spacer. An electric field of $E = 2 \times 10^6$ volts/meter was applied between the electrodes at a defined temperature and the time taken for increase of the light transmission from 0% to 90% was measured as the response time.

EXAMPLE 9

The procedure for the preparation of the liquid-crystalline polymeric composition in the form of a film was substantially the same as in the preceding Examples except that 0.44 m mole of the low-molecular liquid-crystalline compound obtained in Synthetic Example 5 was combined with 0.50 g of the polyester obtained in Preparation Example 2. The data of phase transition behavior thereof and the speed of electric-field response are also shown in Table 1.

EXAMPLE 10

The procedure for the preparation of the liquid-crystalline polymeric composition in the form of a film was substantially the same as in the preceding Examples except that 0.49 m mole of the low-molecular liquid-crystalline compound obtained in Synthetic Example 5 was combined with 0.50 g of a commercial product of polycarbonate resin having a weight-average molecular weight of about 15,000. The data of phase transition behavior thereof and the speed of electricfield response are also shown in Table 1.

TABLE 1

| Example No. | Low-molecular liquid-crystalline compounds | Non-liquid crystalline polymeric compounds | Phase Transition Behavior (°C.) Polymeric composition | Phase Transition Behavior (°C.) Low-molecular liquid-crystalline compound as combined | Speed of Electric-Field Temperature (°C.) | Speed of Electric-Field Speed (μs) |
|---|---|---|---|---|---|---|
| 1 | Synthetic Example 1 | Preparation Example 1 | $g \underset{-28}{\overset{-26}{\rightleftarrows}} Sc^* \underset{9}{\overset{10}{\rightleftarrows}} S_A \underset{13}{\overset{14}{\rightleftarrows}} Iso$ | $Cry \underset{-14}{\overset{-6}{\rightleftarrows}} Sc^* \underset{10}{\overset{11}{\rightleftarrows}} Iso$ | 7 | 600 |
| 2 | Synthetic Example 2 | Preparation Example 1 | $g \underset{-5}{\overset{-2}{\rightleftarrows}} Sc^* \underset{30}{\overset{30}{\rightleftarrows}} S_A \underset{34}{\overset{53}{\rightleftarrows}} Iso$ | $Cry \xrightarrow{78} Iso, \; 15 \nwarrow \; \swarrow 55, \; Sc^* \underset{29}{\rightleftarrows} S_A$ | 28 | 500 |
| 3 | Synthetic Example 3 | Preparation Example 1 | $g \underset{-14}{\overset{-11}{\rightleftarrows}} Sc^* \underset{-2}{\overset{0}{\rightleftarrows}} S_A \underset{3}{\overset{5}{\rightleftarrows}} Iso$ | $Cry \underset{-31}{\overset{-28}{\rightleftarrows}} Sc^* \underset{3}{\overset{3}{\rightleftarrows}} Iso$ | −4 | 800 |
| 4 | Synthetic Example 4 | Preparation Example 1 | $g \underset{11}{\overset{70}{\rightleftarrows}} Sc^* \underset{104}{\overset{105}{\rightleftarrows}} S_A \underset{128}{\overset{138}{\rightleftarrows}} Iso$ | $Cry \underset{30}{\overset{80}{\rightleftarrows}} Sc^* \underset{108}{\overset{105}{\rightleftarrows}} S_A \underset{136}{\overset{136}{\rightleftarrows}} Iso$ | 102 | 300 |
| 5 | Synthetic Example 5 | Preparation Example 1 | $g \underset{-10}{\overset{26}{\rightleftarrows}} Sc^* \underset{89}{\overset{92}{\rightleftarrows}} S_A \underset{95}{\overset{96}{\rightleftarrows}} Iso$ | $Cry \underset{-9}{\overset{9}{\rightleftarrows}} Sc^* \underset{93}{\overset{93}{\rightleftarrows}} S_A \underset{99}{\overset{99.5}{\rightleftarrows}} Iso$ | 87 | 200 |
| 6 | Synthetic Example 6 | Preparation Example 1 | $g \underset{25}{\overset{27}{\rightleftarrows}} Sc^* \underset{110}{\overset{110}{\rightleftarrows}} S_A \underset{141}{\overset{148}{\rightleftarrows}} Iso$ | $Cry \underset{42}{\overset{45}{\rightleftarrows}} Sc^* \underset{114}{\overset{110}{\rightleftarrows}} S_A \underset{151}{\overset{156}{\rightleftarrows}} Iso$ | 108 | 300 |
| 7 | Synthetic Example 7 | Preparation Example 1 | $g \underset{-4}{\overset{3}{\rightleftarrows}} Sc^* \underset{103}{\overset{106}{\rightleftarrows}} S_A \underset{104}{\overset{109}{\rightleftarrows}} Iso$ | $Cry \underset{-9}{\overset{-5}{\rightleftarrows}} Sc^* \underset{95}{\overset{95}{\rightleftarrows}} S_A \underset{105}{\overset{105}{\rightleftarrows}} Iso$ | 102 | 100 |
| 8 | Synthetic Example 8 | Preparation Example 1 | $g \underset{-8}{\overset{-5}{\rightleftarrows}} Sc^* \underset{88}{\overset{90}{\rightleftarrows}} S_A \underset{96}{\overset{97}{\rightleftarrows}} Iso$ | $Cry \underset{-7}{\overset{-6}{\rightleftarrows}} Sc^* \underset{100}{\overset{101}{\rightleftarrows}} Iso$ | 86 | 400 |
| 9 | Synthetic Example 5 | Preparation Example 2 | $g \underset{-13}{\overset{-10}{\rightleftarrows}} Sc^* \underset{87}{\overset{89}{\rightleftarrows}} Iso$ | $Cry \underset{9}{\overset{9}{\rightleftarrows}} Sc^* \underset{93}{\overset{93}{\rightleftarrows}} S_A \underset{99}{\overset{99.5}{\rightleftarrows}} Iso$ | 85 | 500 |

TABLE 1-continued

| Example No. | Low-molecular liquid-crystalline compounds | Non-liquid crystalline polymeric compounds | Phase Transition Behavior (°C.) | | Speed of Electric-Field | |
|---|---|---|---|---|---|---|
| | | | Polymeric composition | Low-molecular liquid-crystalline compound as combined | Temperature (°C.) | Speed (μs) |
| 10 | Synthetic Example 5 | Commercial Product of Polycarbonate | g $\underset{-10}{\overset{0}{\rightleftarrows}}$ Sc* $\underset{85}{\overset{87}{\rightleftarrows}}$ S$_A$ $\underset{98}{\overset{100}{\rightleftarrows}}$ Iso | " | 85 | 500 |

EXAMPLES 11 to 18

Two kinds of the low-molecular liquid-crystalline compounds selected from those obtained in Synthetic Examples 2 to 7 were combined and a liquid-crystalline polymeric composition in the form of a film was prepared in each of these Examples in the same manner as in Examples 1 to 8 except that 0.42 m mole as a total of the two low-molecular liquid-crystalline compounds was used as combined with 0.50 g of the polyester. Table 2 below shows the combination of the low-molecular liquid-crystalline compounds and molar proportion thereof and the phase transition behavior of the liquid-crystalline polymeric compositions the blend of the low-molecular liquid-crystalline compounds and the speed of electric-field response of the polymeric compositions.

EXAMPLE 19

The low-molecular liquid-crystalline compound obtained in Synthetic Example 4 and a polyvinyl acetate having a weight-average molecular weight of about 250,000 as a non-liquid-crystalline polymeric compound were dissolved in methylene chloride in such a proportion that the ratio of the total number of the functional groups of the proton donor and proton acceptor in the non-liquid-crystalline polymeric compound to that of the low-molecular liquid-crystalline compound was 2:1 and the solution was cast on a glass plate where the solution was dried up to give a film of the polymeric composition. The film was heated up to 137° C, where it was in the isotropic phase, and kept for 30 minutes at the same temperature to effect annealing followed by cooling at a cooling rate of 3° C/minute. When the temperature had reached 110° C., where the composition was in the S$_A$ phase, the film was examined on a

TABLE 2

| Example No. | Low-molecular liquid-crystalline compounds | | Non-liquid crystalline polymeric compounds | Phase Transition Behavior (°C.) | | Speed of Electric-Field | |
|---|---|---|---|---|---|---|---|
| | Prepared in Synthetic Example Nos. | Molar proportion of mixing | | Polymeric composition | Low-molecular liquid-crystalline compounds as combined | Temperature (°C.) | Speed (μs) |
| 11 | 2 & 4 | 40:60 | Preparation Example 1 | g $\underset{10}{\overset{55}{\rightleftarrows}}$ Sc* $\underset{91}{\overset{93}{\rightleftarrows}}$ S$_A$ $\underset{104}{\overset{114}{\rightleftarrows}}$ Iso | Cry $\underset{35}{\overset{77}{\rightleftarrows}}$ Sc* $\underset{94}{\overset{97}{\rightleftarrows}}$ S$_A$ $\underset{126}{\overset{130}{\rightleftarrows}}$ Iso | 89 | 300 |
| 12 | | 60:40 | Preparation Example 1 | g $\underset{15}{\overset{41}{\rightleftarrows}}$ Sc* $\underset{64}{\overset{65}{\rightleftarrows}}$ S$_A$ $\underset{85}{\overset{97}{\rightleftarrows}}$ Iso | Cry $\xrightarrow{70}$ S$_A$ $\underset{91}{\overset{105}{\rightleftarrows}}$ Iso; with Sc* at 7/45 | 62 | 200 |
| 13 | 2 & 6 | 40:60 | Preparation Example 1 | g $\underset{1}{\overset{2}{\rightleftarrows}}$ Sc* $\underset{80}{\overset{82}{\rightleftarrows}}$ S$_A$ $\underset{127}{\overset{132}{\rightleftarrows}}$ Iso | Cry $\underset{38}{\overset{45}{\rightleftarrows}}$ Sc* $\underset{92}{\overset{95}{\rightleftarrows}}$ S$_A$ $\underset{138}{\overset{142}{\rightleftarrows}}$ Iso | 78 | 300 |
| 14 | | 60:40 | Preparation Example 1 | g $\underset{-2}{\overset{0}{\rightleftarrows}}$ Sc* $\underset{37}{\overset{41}{\rightleftarrows}}$ S$_A$ $\underset{92}{\overset{99}{\rightleftarrows}}$ Iso | Cry $\underset{36}{\overset{48}{\rightleftarrows}}$ Sc* $\underset{86}{\overset{86}{\rightleftarrows}}$ S$_A$ $\underset{132}{\overset{138}{\rightleftarrows}}$ Iso | 35 | 500 |
| 15 | 3 & 5 | 40:60 | Preparation Example 1 | g $\underset{-17}{\overset{-13}{\rightleftarrows}}$ Sc* $\underset{58}{\overset{60}{\rightleftarrows}}$ S$_A$ $\underset{70}{\overset{75}{\rightleftarrows}}$ Iso | Cry $\underset{-22}{\overset{-15}{\rightleftarrows}}$ Sc* $\underset{63}{\overset{65}{\rightleftarrows}}$ Iso | 56 | 400 |
| 16 | | 60:40 | Preparation Example 1 | g $\underset{-24}{\overset{-19}{\rightleftarrows}}$ Sc* $\underset{35}{\overset{38}{\rightleftarrows}}$ S$_A$ $\underset{47}{\overset{50}{\rightleftarrows}}$ Iso | Cry $\underset{-21}{\overset{-15}{\rightleftarrows}}$ Sc* $\underset{43}{\overset{46}{\rightleftarrows}}$ Iso | 33 | 300 |
| 17 | 3 & 7 | 40:60 | Preparation Example 1 | g $\underset{-14}{\overset{-13}{\rightleftarrows}}$ Sc* $\underset{70}{\overset{76}{\rightleftarrows}}$ S$_A$ $\underset{78}{\overset{81}{\rightleftarrows}}$ Iso | Cry $\underset{-23}{\overset{-20}{\rightleftarrows}}$ Sc* $\underset{74}{\overset{76}{\rightleftarrows}}$ Iso | 68 | 100 |
| 18 | | 60:40 | Preparation Example 1 | g $\underset{-19}{\overset{-18}{\rightleftarrows}}$ Sc* $\underset{51}{\overset{56}{\rightleftarrows}}$ S$_A$ $\underset{51}{\overset{57}{\rightleftarrows}}$ Iso | Cry $\underset{-25}{\overset{-23}{\rightleftarrows}}$ Sc* $\underset{53}{\overset{56}{\rightleftarrows}}$ Iso | 49 | 200 | polarizing microscope to find that the non-liquid-crystalline polymeric compound and the low-molecular liquid-crystalline compound were in a completely blended condition.

COMPARATIVE EXAMPLE 1

A film of a liquid-crystalline polymeric composition was prepared in substantially the same manner as in Example 19 excepting replacement of the low-molecular liquid-crystalline compound obtained in Synthetic Example 4 with the same amount of another low-molecular liquid-crystalline compound having no proton donor and expressed by the structural formula

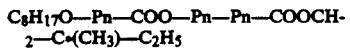

The film was heated up to 171° C., where it was in the isotropic phase, and annealed by keeping for 30 minutes at the same temperature followed by cooling at a cooling rate of 3° C./minute. When the temperature had reached 150° C., where the composition was in the $S_A$ phase, the film was examined on a polarizing microscope to find that the non-liquid-crystalline polymeric compound and the low-molecular liquid-crystalline compound were in a condition of incomplete blending with partial separation.

EXAMPLE 20

For the film of the polymeric composition obtained in Example 4, the same experiment as in Example 19 was repeated except that the cooling rate of the film of the liquid-crystalline polymeric composition from 137° C. to 110° C. was increased from 3° C./minute to 10° C./minute. The result of the examination on a polarizing microscope was substantially the same as in Example 19 showing a condition of complete blending of the components.

EXAMPLE 21

Liquid-crystalline polymeric compositions were prepared by blending one of the low-molecular liquid-compositions used in Examples 1 to 8 or one of the combinations of the low-molecular liquid-crystalline compounds used in Examples 11 to 18 in an amount of 0.42 m mole and a combination of three non-liquid-crystalline polymeric compounds of commercial products including 0.12 g of a polyacrylic acid having a weight-average molecular weight of 250,000, 0.14 g of a polyvinyl acetate having a weight-average molecular weight of 250,000 and 0.07 g of a polyvinyl alcohol having a weight-average molecular weight of 250,000. Each of the polymeric compositions was shaped into a film which was examined on a polarizing microscope in the same manner as in the preceding examples to find a condition of complete blending of the components.

The liquid-crystalline polymeric composition of the present invention is not a mere blend of a non-liquid-crystalline polymeric compound and a low-molecular liquid-crystalline compound but the components are in a condition of uniform dispersion by forming hydrogen bonds therebetween so that the composition is free from the problem of phase separation and has excellent shape retain-ability with a ferroelectric phase. Therefore, the composition exhibits stable responsivity of high speed without unevenness to any electric or optic input. Accordingly, the liquid-crystalline polymeric composition of the invention is very useful in wide industrial fields or, in particular, in the field of optoelectronics as a material of switching elements, display elements, optoelectronic shutters, optical modulation, optical-path changeover switches, memories, variable focal-distance lenses and the like in optical communication and so on.

What is claimed is:

1. A ferroelectric polymeric liquid-crystalline composition comprising a hydrogen bonded product of
a non-liquid-crystalline polymer having proton transfer functionality selected from the group consisting of poly(acrylic) acid), poly(methacrylic acid), polyacrylates, polymethacrylates, polyacrylamide, polyvinyl alcohol, polyvinyl acetate, polycarbonate, polyesters obtained by the condensation reaction of a dicarboxylic acid derivative and a diol derivative, polyamides obtained by the condensation reaction of a dicarboxylic acid derivative and a diamine derivative, polyamides obtained by the condensation reaction of a dicarboxylic acid derivative and a monoalcohol or monoamine derivative, the polymerization degree of the polymer being 10–10,000; and
a low-molecular weight liquid-crystalline compound which has a proton transfer functionality opposite to and reactive with the proton transfer functionality of said polymer, to produce hydrogen bonding, said low-molecular weight liquid-crystalline compound
is at least one compound selected from the group consisting of
(a) 2-methylbutyl 4'-(10-(2,2-diacetoxymethyl) propionyloxy decyloxy) biphenyl 4-carboxylate,
(b) 2-methylbutyl 4-(4'-{12-(2,2-dihydroxymethyl propionyloxy) dodecyloxy} benzoyloxy) benzene-4-carboxylate.
(c) 2-methylbutyl 4-(4'-{12-(2,2-deacetoxymethyl propionyloxy) dodecyloxy} benxoyloxy) benzene-4-carboxylate,
(d) 2-methylbutyl 4-(4'-{12-(2,2-dihydroxymethyl propionyloxy) dodecyloxy} benzoyloxy)biphenyl-4-carboxylate,
(e) 2-methylbutyl 4'-(4"-{12-(2,2-diacetoxymethyl propionyloxy) dodecyloxy}benzoyloxy)biphenyl-4-carboxylate,
(f) 2-methylbutyl 4-(4"-{12-(2,2-dihydroxymethyl propionyloxy) dodecyloxy} biphenyl-4'-carbonyloxy)benzoate,
(g) 2-methylbutyl 4-(4"-{12-(2,2-diacetoxymethyl propionyloxy) dodecyloxy} biphenyl 4'-carbonyloxy)benzoate, and
(h) 2-chloro-3-methylpentyl 4-(4"-{12-(2,2-diacetoxymethyl) propionyloxy} dodecyloxy) biphenyl-4'-carbonyloxy benzoate; the number of the proton transfer functionality groups of the non-liquid crystalline polymer being from 10:1 to 1:2 as compared with the low-molecular weight liquid-crystalline compound.

2. The ferroelectirc polymeric liquid-crystalline composition as claimed in claim 1 wherein the non-liquid-crystalline polymer is selected from the group consisting of a polyester having recurring units of the formula (1) or (2):

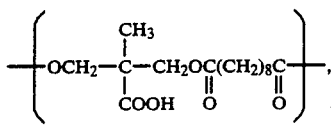  (1)

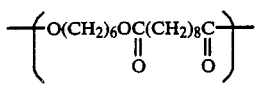  (2)

3. The ferroelectric polymeric liquid-crystalline composition as claimed in claim 1 wherein the non-liquid-crystalline polymer contains a proton acceptor and the low-molecular weight liquid-crystalline compound contains a proton donor.

4. The ferroelectric polymeric liquid-crystalline composition as claimed in claim 1 wherein the non-liquid crystalline polymer contains a proton donor and the low-molecular weight liquid-crystalline compound contains a proton acceptor.

5. The ferroelectric polymeric liquid-crystalline composition as claimed in claim 1 wherein the non-liquid-crystalline polymer is a polyester composed of the recurring units expressed by the formula:

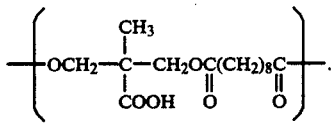

6. The ferroelectric polymeric liquid-crystalline composition as claimed in claim 1 wherein the non-liquid crystalline polymer is a polyester composed of the recurring units expressed by the formula:

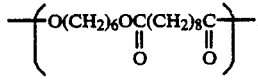

7. The ferroelectric polymeric liquid-crystalline composition as claimed in claim 1, wherein the non-liquid crystalline polymer is a polycarbonate.

8. The ferroelectric polymeric liquid-crystalline composition as claimed in claim 1, wherein the low-molecular weight liquid-crystalline compound is 2-methylbutyl 4-[4''-{12-(2,2-dihydroxymethyl propionyloxy) dodecyloxy} biphenyl-4'-carbonyloxy] benzoate.

9. The ferroelectric polymeric liquid-crystalline composition as claimed in claim 5, wherein the low-molecular weight liquid-crystalline compound is 2-methylbutyl 4-[4''-{12 -(2,2-dihydroxymethyl propionyloxy dodecyloxy} biphenyl-4'-carbonyloxy] benzoate and wherein said range is from 3:1 to 1:1.

10. The ferroelectric polymeric liquid-crystalline composition as claimed in claim 6, wherein the low-molecular weight liquid-crystalline compound is 2-methylbutyl 4-[4''-{12-(2,2-dihydroxymethyl propionyloxy dodecyloxy} biphenyl-4'-carbonyloxy] benzoate and wherein said range is from 3:1 to 1:1.

11. The ferroelectric polymeric liquid-crystalline composition as claimed in claim 7, wherein the low-molecular weight liquid-crystalline compound is 2-methylbutyl 4-[4''-{12-(2,2-dihydroxymethyl propionyloxy dodecyloxy} biphenyl-4'-carbonyloxy] benzoate and wherein said range is from 3:1 to 1:1.

12. The ferroelectric polymeric liquid-crystalline composition as claimed in claim 1, wherein the low-molecular weight liquid-crystalline compound is 2-methylbutyl 4'-(10-(2,2-diacetoxymethyl) propionyloxy decyloxy) biphenyl 4-carboxylate.

13. The ferroelectric polymeric liquid-crystalline composition as claimed in claim 1, wherein the low-molecular weight liquid-crystalline compound is 2-methylbutyl 4-(4'-{12-(2,2-dihydroxymethyl propionyloxy) dodecyloxy} benzoyloxy) benzene-4-carboxylate.

14. The ferroelectric polymeric liquid-crystalline composition as claimed in claim 1, wherein the low-molecular weight liquid-crystalline compound is 2-methylbutyl 4-(4'-{12-(2,2-deacetoxymethyl propionyloxy) dodecyloxy} benxoyloxy) benzene-4-carboxylate.

15. The ferroelectric polymeric liquid-crystalline composition as claimed in claim 1, wherein the low-molecular weight liquid-crystalline compound is 2-methylbutyl 4(4'-{12-(2,2-dihydroxymethyl propionyloxy) dodecyloxy} benzoyloxy) biphenyl-4-carboxylate.

16. The ferroelectric polymeric liquid-crystalline composition as claimed in claim 1, wherein the low-molecular weight liquid-crystalline compound is 2-methylbutyl 4-(4''-{12-(2,2-diacetoxymethyl propionyloxy) dodecyloxy} benzoyloxy) biphenyl-4-carboxylate.

17. The ferroelectric polymeric liquid-crystalline composition as claimed in claim 1, wherein the low-molecular weight liquid-crystalline compound is 2-methylbutyl 4-(4''-{12-(2,2-diacetoxymethyl propionyloxy) dodecyloxy) biphenyl 4'-carbonyloxy) benzoate.

18. The ferroelectric polymeric liquid-crystalline composition as claimed in claim 1, wherein the low-molecular weight liquid-crystalline compound is 2-chloro-3-methylpentyl 4-(4''-{12-(2,2-diacetoxymethyl) propionyloxy} dodecyloxy) biphenyl-4'-carbonyloxy benzoate.

* * * * *